(12) United States Patent
Hamilton, II et al.

(10) Patent No.: US 7,518,715 B1
(45) Date of Patent: Apr. 14, 2009

(54) METHOD FOR DETERMINATION OF EFFICIENT LIGHTING USE

(75) Inventors: Rick A. Hamilton, II, Charlottesville, VA (US); Paul A. Moskowitz, Yorktown Heights, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/145,406

(22) Filed: Jun. 24, 2008

(51) Int. Cl.
*G01J 1/42* (2006.01)
(52) U.S. Cl. .................. 356/218; 356/226; 356/229; 340/635; 315/291
(58) Field of Classification Search ......... 356/121–123, 356/213–235; 250/226; 340/636, 638, 664; 315/291; 705/6
See application file for complete search history.

(56) References Cited

U.S. PATENT DOCUMENTS

| 4,220,412 A | * | 9/1980 | Shroyer et al. ............... 356/218 |
| 4,827,119 A | * | 5/1989 | Gaboury .................. 250/214 R |
| 5,037,798 A | * | 8/1991 | Etzbach et al. .............. 503/227 |
| 5,061,997 A |   | 10/1991 | Rea et al. |
| 5,307,058 A |   | 4/1994 | Tokizane et al. |
| 5,548,398 A | * | 8/1996 | Gaboury ...................... 356/218 |
| 6,515,275 B1 | * | 2/2003 | Hunter et al. ................ 250/226 |
| 6,542,082 B1 | * | 4/2003 | Nowka et al. ............... 340/635 |
| 7,206,072 B2 | * | 4/2007 | Takahashi et al. ........... 356/406 |
| 7,262,690 B2 |   | 8/2007 | Heaton et al. |
| 7,355,523 B2 |   | 4/2008 | Sid |
| 7,382,454 B1 | * | 6/2008 | Turner ......................... 356/416 |
| 2004/0201448 A1 |   | 10/2004 | Wang |
| 2005/0086100 A1 | * | 4/2005 | Yanagisawa et al. .......... 705/13 |
| 2005/0225263 A1 | * | 10/2005 | Van Egmond ............... 315/291 |
| 2006/0049935 A1 |   | 3/2006 | Giannopoulos et al. |
| 2008/0019113 A1 | * | 1/2008 | Smith ............................ 362/1 |
| 2008/0105620 A1 | * | 5/2008 | Hicks ......................... 210/681 |
| 2008/0218171 A1 | * | 9/2008 | Keith et al. .................. 324/414 |

FOREIGN PATENT DOCUMENTS

| JP | 2006339740 | 12/2006 |
| WO | WO 96/36202 | 11/1996 |

OTHER PUBLICATIONS

"Microcontrollers provide power control for lighting applications", by Steve Bowling, Technical Staff Engineer, Microchip Technology, Inc., Apr. 1, 2008, 5 pages.

* cited by examiner

*Primary Examiner*—Hoa Q Pham

(57) ABSTRACT

A method for receiving light from a plurality of light sources using an apparatus configured to analyze the time dependence of the light intensity to determine a type of light bulb and light intensity from the plurality of light sources based upon a detected frequency of variation of the light intensity.

1 Claim, 4 Drawing Sheets

METHOD FOR DETERMINATION OF EFFICIENT LIGHTING USE

FIELD OF THE INVENTION

The invention relates generally to remote detection of a source of light and more specifically to the determination of bulb type and intensity from a distance.

DESCRIPTION OF THE RELATED ART

The IPCC, Intergovernmental Panel on Climate Change, has stated in their summary report of 2007 that most of the temperature increases seen by the world are most likely caused by anthropogenic GHG, greenhouse gas, emissions. Climate change resulting from greenhouse gas emissions has resulted in international agreements on limiting and reducing such emissions, for example, the Kyoto agreement. Even in the United States, a country that has not ratified the Kyoto agreement, there is movement to reduce greenhouse gas emissions by reducing the use of energy. The US Energy Independence and Security Act of 2007 mandates an energy efficiency increase of 30 percent for light bulbs by 2012. In effect, this will result in the replacement of incandescent light bulbs (ILBs), by compact fluorescent lights (CFLs), or light emitting diodes (LEDs) by 2012. Compact fluorescent lights and LEDs are more efficient sources of light because they convert more of the electricity used into light and less into wasted heat.

The desirability of and the law in the US for reducing electric energy use will require the replacement of traditional ILBs by CFLs or LEDs. It difficult or impossible to tell the difference through remote visual inspection between the types of bulbs if the bulb structure is hidden. The bulb may be contained within a frosted envelope or not viewed directly. The appearance of the light emitted is very similar for most CFLs and ILBs. The direction of the CFL industry is to produce bulbs which have a color appearance similar to that of ILBs. It is desirable to determine the bulb type quickly and easily from a distance to aid in the replacement of ILBs by CFLs in large installations. It is also desirable to determine the compliance with the law by households, businesses, and governments.

SUMMARY

In one aspect, the present invention provides a method including receiving light from a plurality of light sources using an apparatus configured to analyze and detect a frequency of variation of light intensity; determining a type of light bulb and light intensity from the plurality of light sources based upon the detected frequency of variation of the light intensity, the frequency of variation being one of a multiple of a power company supply frequency and 20 to 60 kHz; determining the geographic area of the plurality of light sources; calculating the ratio of light intensities from efficient and inefficient lighting sources for the plurality of light sources within the geographic area and automatically reporting the ratio to one of a carbon offset provider and an enforcement agency; and reporting the determinations and calculation to a user.

Although the total appearance of the emitted light may look similar, the intensity of light from light bulbs of different types differs in the time domain. Traditional ILBs emit light through the mechanism of radiation from a heated filament. The light intensity is constant in the time domain. Fluorescent bulbs (including CFLs), and LEDs emit light that is characterized by rapid variations of intensity in time.

The invention provides a method for discriminating based upon the time-varying characteristics of the light sources to determine which type of bulb is in use. In an alternative aspect, the emission spectrum of the light sources is used to discriminate between CFLs and LEDs, and ILBs. CLFs and LEDs show a spectrum of distinct emission lines, while ILBs show a continuous spectrum of light.

The present invention permits the remote inspection of light sources, which is advantageous when lights are not easily accessible for close visual inspection. A user may desire to remotely inspect light sources during migration from ILBs to CFLs and LEDs to determine which bulbs have already been replaced. Additionally, companies and governments may desire to use the present invention to ensure compliance.

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE DRAWINGS

The foregoing features and other features of the present invention will now be described with reference to the drawings. In the drawings, the same components have the same reference numerals. The illustrated embodiment is intended to illustrate, but not to limit the invention. The drawings include the following Figures.

DETAILED DESCRIPTION

The electricity supplied by power companies reverses polarity typically 110 or 120 times per second (supply of 60 Hz in US and 50 Hz in Europe.), fluorescent lights turn on and off at that rate, which may cause a change in intensity or flicker. Incandescent lights do not produce this flicker because the light is produced by a hot glowing wire. This wire is not affected by electrical polarity switches, since the wire stays hot and glows steadily. Fluorescent-type lights and LEDs with high-efficiency ballasts may have a flicker rate of 20 kHz to 60 kHz.

Figure 1:
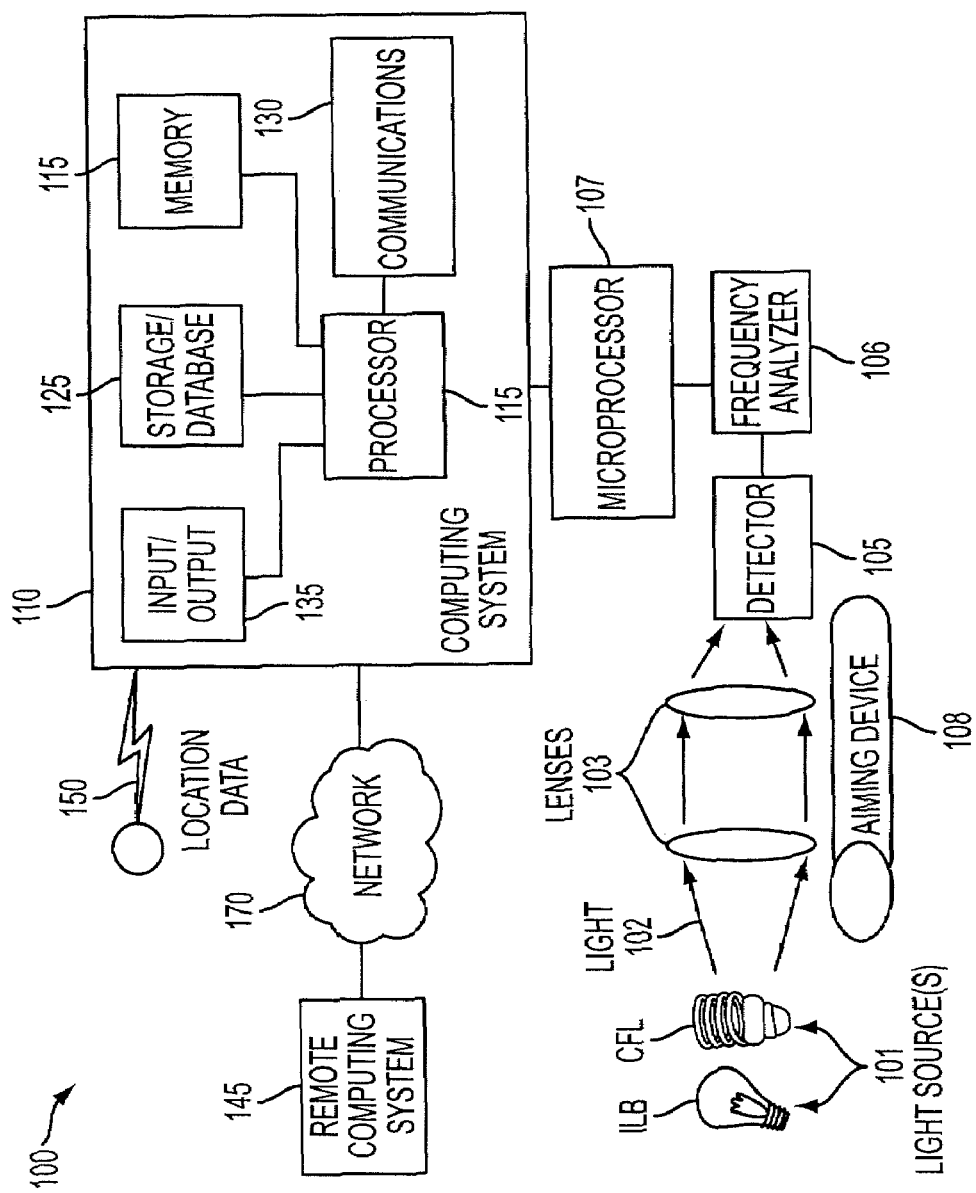
FIG. 1 is a schematic diagram of a system for determining a type of light source using time domain resolution in accordance with an embodiment of the present invention.

FIG. 1 is a schematic illustration of a system 100 for determining a type of light source from a plurality of light sources 101 using time domain resolution in accordance with an embodiment of the present invention. System 100 uses these innate characteristics of differing light sources 101 to remotely ascertain the type of light source.

As shown in FIG. 1, lens or lenses 103 on a detector 105 may be used to focus light 102. Detector 105 may include or be built into a small hand-held portable or mobile device, which may be equipped with wireless communication capabilities such as Wi-Fi (IEEE 802.11a, b, or g), mobile phone, or Bluetooth. Additionally, to aid in the aiming of detector 105, it may be fitted with an optical aiming device 108 including, for example, lenses, or a laser pointer. Laser pointers may employ a helium-neon laser for example. Such lasers are now built into small battery-powered "pocket pointers" for use in lectures.

An analyzer 106, which may include time domain or frequency dependant electronic filters may be used to distinguish among an ILB with a relatively constant level of light intensity, and that of fluorescent bulbs or LEDs that have a 120 Hz, or 20 kHz or above time variation in light intensity. An example of a time domain or frequency analyzer is the RSA3000B Series of Real-Time Spectrum Analyzers manufactured by the Tektronix Corporation. The use of a light source 101 other than an ILB may be determined by measuring the frequency of change of the light intensity.

The results of the frequency analysis may be transferred to a microprocessor 107 including logic to discern bulb types based on measurements gathered from analyzer 106. Microprocessor 107 may also calculate the ratio of the maximum light intensity to the minimum light intensity for one cycle. For an ILB, the ratio may be approximately one; for other light sources there may be a much greater ratio of maximum to minimum intensity.

The output of microprocessor 107 may be reported to a simple display (not shown) or a computing system 110 that may perform further analysis. Computing system 110 may include a processor and memory 115, a storage/database 125, a communications module 130 and an input/output capability 135.

Additionally, system 100 may receive input from a geographic positioning system, for example, a GPS satellite or a wireless phone system, to incorporate position or location data 150 that may be transferred over a network 170 to computing system 110. For instance, computing system 110 may detect and record the location of ILB street lamps that need to be exchanged for CFLs.

In one embodiment, the analysis for a group of light sources 101, or integrated light sources may be sent through network 170 to a remote computing system 145 acting in a monitoring function associated with, for example, an enforcement agency. The detection integration may be for an individual, company, or town. The integrated light may be analyzed for relative intensities of efficient and inefficient sources and a ratio may be calculated. For instance, the ratio of efficient lighting use to inefficient lighting use may be determined for a geographical area including a building, a block of buildings or a larger geographic area or political area, such as a town, county, state, or country. Observations of the larger areas may be conducted from tall buildings, towers, aircraft or satellites.

For example, if an overall analysis of a street or town indicates less than a threshold use of CFLs (for example, less than 20% of the bulbs), then a signal may be transmitted to a carbon-offset provider. Such a provider normally takes an action (for example, plants trees) to offset carbon use or to offset or mitigate deleterious actions. Services may be used to manage such signals. Profiles stored in databases may specify and control the amount of offset. Similarly, an automatic signal may be sent to a service that issues a fine, a warning, or takes another action against an individual, group, government, and the like. CFL bulbs may be sent to users as a result of such an analysis. Similarly, such signals may trigger rewards (for example, congratulation letters, rebates, decrease in payments, bonuses, coupons, discounts) to individuals or groups.

Figure 2:
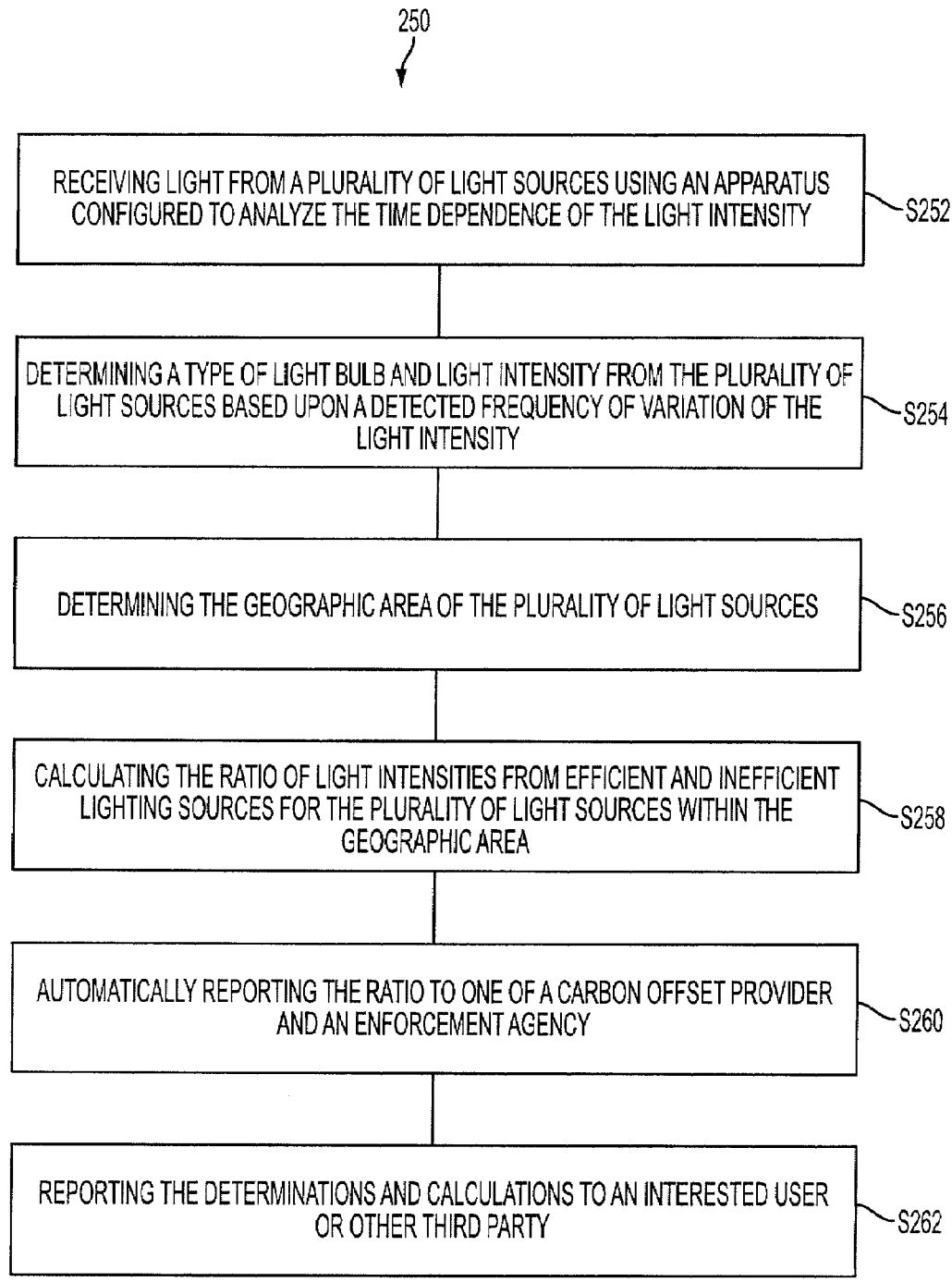
FIG. 2 is a flow diagram of a method for determining a type of light source using time domain resolution in accordance with an embodiment of the present invention.

FIG. 2 is a flow diagram of a method 250 for determining a type of light source using time domain resolution in accordance with an embodiment of the present invention. In one embodiment, method 250 includes receiving light from a plurality of light sources using an apparatus configured to analyze the time dependence of the light intensity (s252); determining a type of light bulb and light intensity from the plurality of light sources based upon a detected frequency of variation of the light intensity (s254). The frequency of variation being one of a multiple of a power company supply frequency and 20 to 60 kHz.

Method 250 also includes determining the geographic area of the plurality of light sources (s256); calculating the ratio of light intensities from efficient and inefficient lighting sources for the plurality of light sources within the geographic area (s258) and automatically reporting the ratio to one of a carbon offset provider and an enforcement agency (s260). Once method 250 has been completed or as desired the determinations and calculation are reported to the interested user or other third party (s262).

Figure 3:
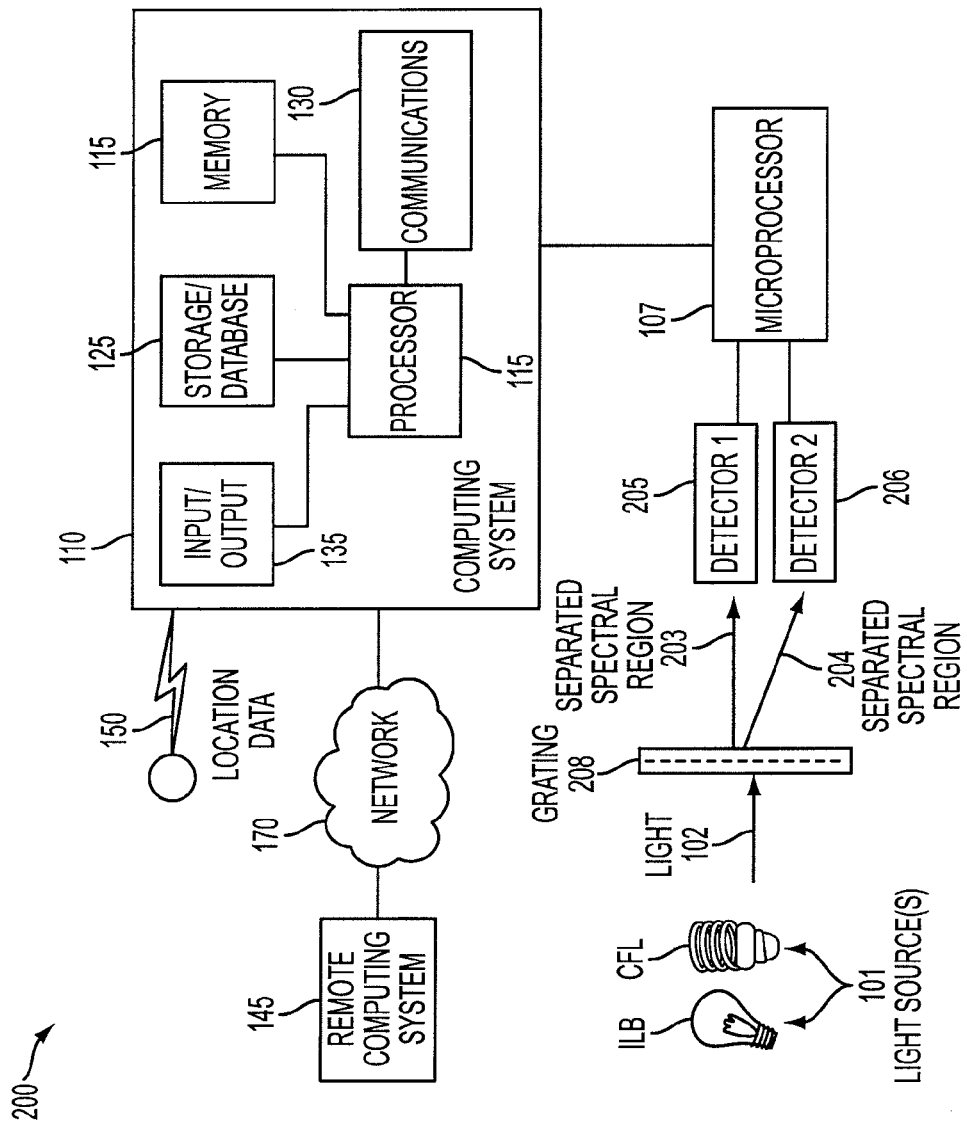
FIG. 3 is a schematic diagram of a system for determining a type of light source using the emission spectrum of the light source in accordance with an embodiment of the present invention.

FIG. 3 is a schematic diagram of a system 200 for determining a type of light source 101 using the emission spectrum of light source 101 in accordance with an embodiment of the present invention. In this embodiment, the emission spectrum is used as a means of discrimination between CFLs and ILBs.

Fluorescent lights including CFLs normally use a small amount of mercury vapor in their discharge. Atomic mercury produces both visible and ultraviolet UV light in its emission spectrum. The visible light adds to the total illumination directly. The UV light excites phosphors in the inner wall of the lamp envelope to produce light of the desired color.

Because CFLs use mercury, they display strong atomic mercury emission lines at 436 nm (blue), 546 nm (green), and a pair at 577 nm and 579 nm (yellow-orange), as well as UV lines at 254 nm and 184 nm. A large fraction of the emitted light is in these lines, with much lower emission in the space between the lines. The 436, 546 and 577-579 nm lines are especially bright. The light appears to be like that of an ILB. However the ILB spectrum is continuous.

LEDs are generally monochromatic, each LED having one color wavelength. Illumination lamps made of LEDs may use three different color LEDs to produce a white light. When analyzed, the spectrum of an LED lamp will have distinct lines, usually one each of red, green, and blue. The analysis used below for CFLs may also be applied to LED lamps.

In the visible spectrum of CFL, the strong 546 nm green mercury line is in the center. The yellow mercury 577-579 group is to the left of center and the blue mercury 436 nm line is to the right of center. There is a deep valley in intensity between the green and yellow lines, also between the green and blue lines.

In the visible spectrum of ILB, the intensity changes slowly over the visible spectrum and is approximately unchanged over adjacent segments.

In one embodiment, referring to FIG. 3, light 102 from a light source 101, such as a bulb, either ILB or CFL, passes through a grating 208 where it is separated into its spectral components 203 and 204, according to the well known grating formula:

$$d \sin q = nl,$$

where d is the grating spacing, q is the angle of refraction, n is the order of the spectrum and l is the wavelength of the light.

Longer wavelengths (i.e. red) are refracted at greater angles than are shorter wavelengths (i.e. blue). Accordingly, specific regions of the spectrum may be directed to separate detectors, such as detectors 205 and 206. Their intensities in terms of voltage or current in detectors 205 and 206 are then directed to a microprocessor 107 where the intensities are compared and a determination is made whether the light is from an ILB or CFL.

For example, comparing the intensity of a region cantered on the 546 nm line compared to that of a region centered on the gap between 546 and 577 nm, at around 560 nm, the ratio of brightness for a CFL may be at least 10:1, while for a ILB it may be about 1:1.

The output of microprocessor 107 may be reported to the simple display (not shown) or computing system 110 for further use and analysis as stated above.

The apparatus may employ mirrors and lenses for directing and focusing the light. Instead of a grating, a prism may be employed or glass filters may be used.

Figure 4:
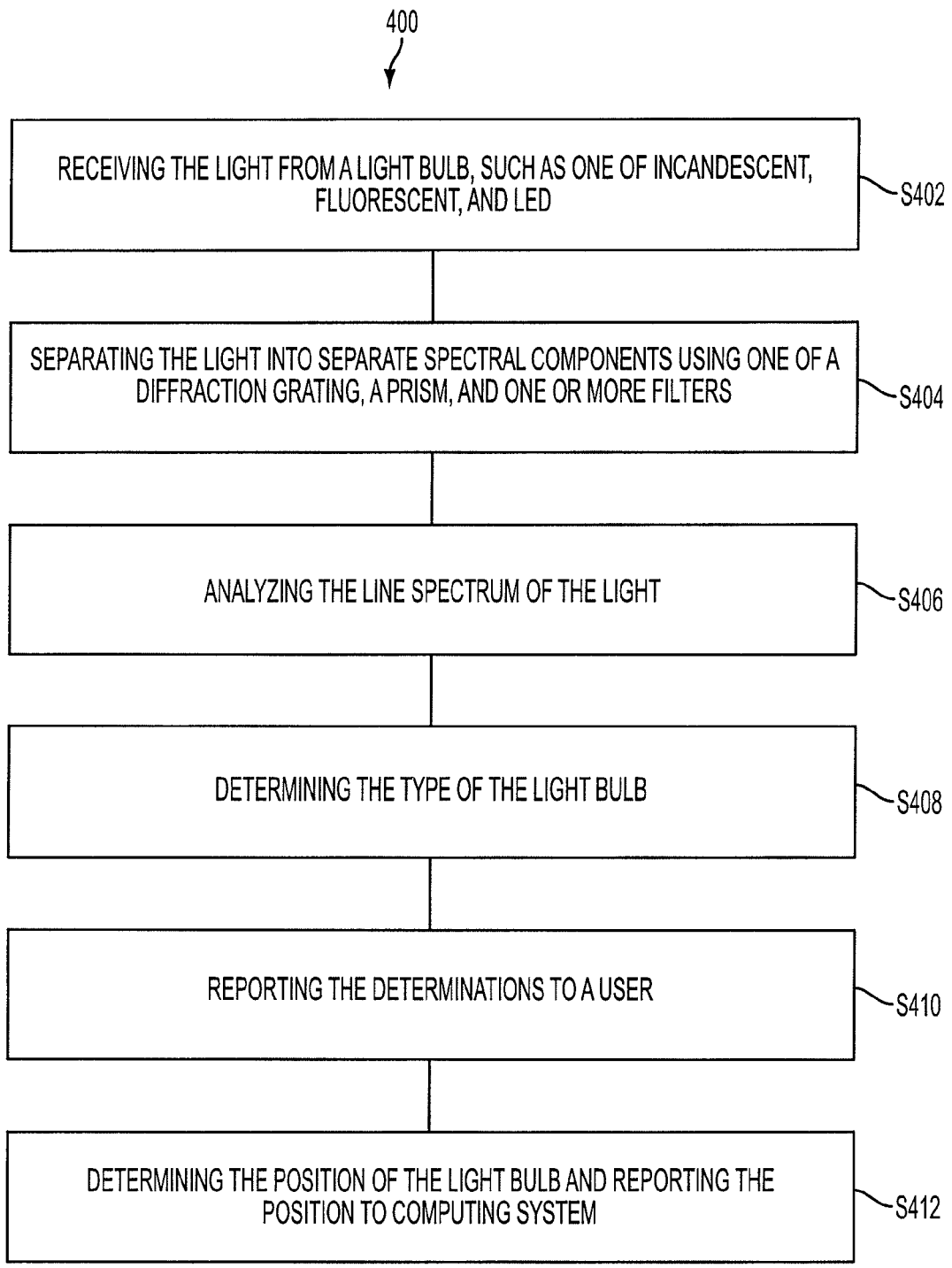
FIG. 4 is a flow diagram of a method for determining a type of light source using the emission spectrum of the light source in accordance with an embodiment of the present invention.

FIG. 4 is a flow diagram of a method 400 for determining a type of light source using the emission spectrum of the light source in accordance with an embodiment of the present invention 1. In one embodiment, method 400 includes receiving the light from a light bulb, such as one of incandescent, fluorescent, and LED (s402), separating the light into separate spectral components using one of a diffraction grating, a prism, and one or more filters (s404), analyzing the line spectrum of the light (s406), determining the type of the light bulb (s408) and reporting the determinations (s410) to a user.

On one embodiment, the determination is made by determining the ratio of intensities of the gap between spectral lines with the intensity of the spectral line. The lines may include one or more of the mercury 546 nm line, the mercury 436 nm line, and the mercury 577-579 nm lines.

In yet another embodiment, method 400 may include determining the position of the light bulb and reporting the position to computing system 110 (s412).

The invention has been disclosed in an illustrative manner. Accordingly, the terminology employed throughout should be read in an exemplary rather than a limiting manner. Although minor modifications of the invention will occur to those of ordinary skill in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

What is claimed is:

1. A method comprising:
   receiving light from a plurality of light sources using an apparatus configured to analyze and detect a frequency of variation of the light intensity;
   determining a type of light bulb and light intensity from the plurality of light sources based upon the detected frequency of variation of the light intensity, the frequency of variation being one of a multiple of a power company supply frequency and 20 to 60 kHz;
   determining the geographic area from which the plurality of light sources emanate;
   calculating the ratio of light intensities from efficient and inefficient lighting sources for the plurality of light sources within the geographic area and automatically reporting the ratio to one of a carbon offset provider and an enforcement agency; and
   reporting the determinations and calculation to a user.

* * * * *